(12) United States Patent
Fan et al.

(10) Patent No.: US 10,409,329 B2
(45) Date of Patent: Sep. 10, 2019

(54) ELECTRONIC DEVICE, DISPLAY MODULE AND DISPLAY APPARATUS

(71) Applicant: GUANGDONG OPPO MOBILE TELECOMMUNICATIONS CORP., LTD., Dongguan, Guangdong (CN)

(72) Inventors: Xiaoyu Fan, Guangdong (CN); Xiaoming Bao, Guangdong (CN); Maozhao Huang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/020,439

(22) Filed: Jun. 27, 2018

(65) Prior Publication Data

US 2019/0025884 A1  Jan. 24, 2019

(30) Foreign Application Priority Data

Jul. 21, 2017 (CN) .......................... 2017 1 0598947
Jul. 21, 2017 (CN) ...................... 2017 2 0898888 U (51) Int. Cl.
*G06F 1/16* (2006.01)
*G06F 21/32* (2013.01)
(Continued)

(52) U.S. Cl.
CPC .......... *G06F 1/1637* (2013.01); *G06F 1/1656* (2013.01); *G06F 21/32* (2013.01);
(Continued)

(58) Field of Classification Search
CPC ..... H05K 1/028; G06F 1/1637; G06F 1/1656; G06F 21/32; G02F 1/13452; G06K 9/00013
See application file for complete search history.

(56) References Cited

U.S. PATENT DOCUMENTS 7,292,290 B2 * 11/2007 Miyagawa ............ G06F 1/1601
349/58
8,149,349 B2 * 4/2012 Jang .................. G02F 1/133308
349/58
(Continued)

FOREIGN PATENT DOCUMENTS

CN      203838722 U    9/2014
CN      105225872    *  1/2016  ............ H01H 13/06
(Continued)

OTHER PUBLICATIONS

Machine generated English translation of CN206313842U.
(Continued)

*Primary Examiner* — Adrian S Wilson
(74) *Attorney, Agent, or Firm* — Ladas & Parry LLP (57) ABSTRACT

An electronic device, a display module and a display apparatus are disclosed. The electronic device may include a shell assembly, a display assembly and a fingerprint assembly. The shell assembly may have a display face and be connected to the shell assembly. The fingerprint assembly may be connected to the shell assembly. An orthographic projection area of the fingerprint assembly on the display assembly in a projection direction perpendicular to a finger contact plane of the fingerprint assembly may be defined as a second region, at least part of the second region may be overlapped with the display face.

17 Claims, 8 Drawing Sheets (51) Int. Cl.
*G06K 9/00* (2006.01)
*H04M 1/02* (2006.01)

(52) U.S. Cl.
CPC ..... *G06K 9/00006* (2013.01); *G06K 9/00013* (2013.01); *H04M 1/0266* (2013.01)

(56) References Cited

U.S. PATENT DOCUMENTS

| | | | |
|---|---|---|---|
| 8,269,731 B2* | 9/2012 | Molne | G06F 1/1626 |
| | | | 345/173 |
| 9,622,391 B2* | 4/2017 | Lee | G02F 1/13452 |
| 9,710,689 B2 | 7/2017 | Evans et al. | |
| 2006/0139271 A1* | 6/2006 | Okuda | G02F 1/133308 |
| | | | 345/88 |
| 2011/0102567 A1* | 5/2011 | Erhart | G06K 9/00026 |
| | | | 348/77 |
| 2013/0265256 A1* | 10/2013 | Nathan | G06F 3/0414 |
| | | | 345/173 |
| 2015/0036065 A1* | 2/2015 | Yousefpor | G06K 9/228 |
| | | | 349/12 |
| 2015/0177884 A1 | 6/2015 | Han | |
| 2015/0254491 A1 | 9/2015 | Mo et al. | |
| 2016/0004899 A1* | 1/2016 | Pi | G06F 1/1626 |
| | | | 345/173 |
| 2016/0266695 A1 | 9/2016 | Bae et al. | |
| 2017/0249494 A1 | 8/2017 | Zhang et al. | |
| 2018/0034948 A1* | 2/2018 | Yu | G06F 1/1684 |
| 2018/0089492 A1 | 3/2018 | Cai | |

FOREIGN PATENT DOCUMENTS

| | | |
|---|---|---|
| CN | 207184551 U | 4/2017 |
| CN | 106662900 A | 5/2017 |
| CN | 206313842 U | 7/2017 |
| CN | 107332949 A | 11/2017 |
| JP | 2002366056 A | 12/2002 |

OTHER PUBLICATIONS

Machine generated English translation of JP2002366056A.
Machine generated English translation of CN207184551U.
Machine generated English translation of CN107332949A.
Machine generated English translation of CN106662900A.
International Search Report issue in by WIPO in International Patent Application PCT/CN2018/088731.
European search report for Application No. EP18175739.4, dated Jan. 2, 2019 (8 pages).
Espacenet English abstract of CN 203838722 U.

* cited by examiner

ELECTRONIC DEVICE, DISPLAY MODULE AND DISPLAY APPARATUS

CROSS-REFERENCE TO RELATED APPLICATIONS

This application claims priorities to Chinese Patent Application No. 201720898888.4, filed on Jul. 21, 2017, and Chinese Patent Application No. 201710598947.0, field on Jul. 21, 2017, the contents of which are herein incorporated by reference in their entireties.

TECHNICAL FIELD

The present disclosure generally relates to a communication device, and in particular relates to an electronic device, a display module and a display apparatus.

BACKGROUND

In an existing display device having a fingerprint recognition function, a fingerprint recognition module is typically disposed at the non-display area of the device. In this way, placing the fingerprint recognition module at the non-display area of the device reduces the screen-to-body ratio which goes against the trend towards a narrower bezel of the device.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Below embodiments of the disclosure will be described in detail, examples of which are shown in the accompanying drawings, in which the same or similar reference numerals have been used throughout to denote the same or similar elements or elements serving the same or similar functions. The embodiments described below with reference to the accompanying drawings are exemplary only, meaning they are intended to be illustrative of rather than limiting the disclosure.

In the specification of the present disclosure, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counter-clockwise", "axial", "radial", and "circumference" refer to the orientations and locational relations illustrated in the drawings, and for describing the present disclosure and for describing in a simple manner, and which are not intended to indicate or imply that the device or the elements are disposed to locate at the specific directions or are structured and performed in the specific directions, which could not to be understood as limiting the present disclosure.

In addition, terms such as "first" and "second" are used herein for purposes of description and are not intended to indicate or imply relative importance or significance or to imply the number of indicated technical features. Thus, the feature defined with "first" and "second" may include one or more of such a feature. In the description of the present disclosure, "a plurality of" means two or more than two, unless specified otherwise.

In the present disclosure, unless specified or limited otherwise, terms "mounted", "connected", "coupled", "fixed", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the following, an electronic device 100 provided in embodiments of the present disclosure will be described with reference to drawings.

The electronic device 100 may include mobile phones, computers or tablet computers, etc. It should be understood that "electronic device 100" in this disclosure can include, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. Examples of the electronic device 100 include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Figure 1:
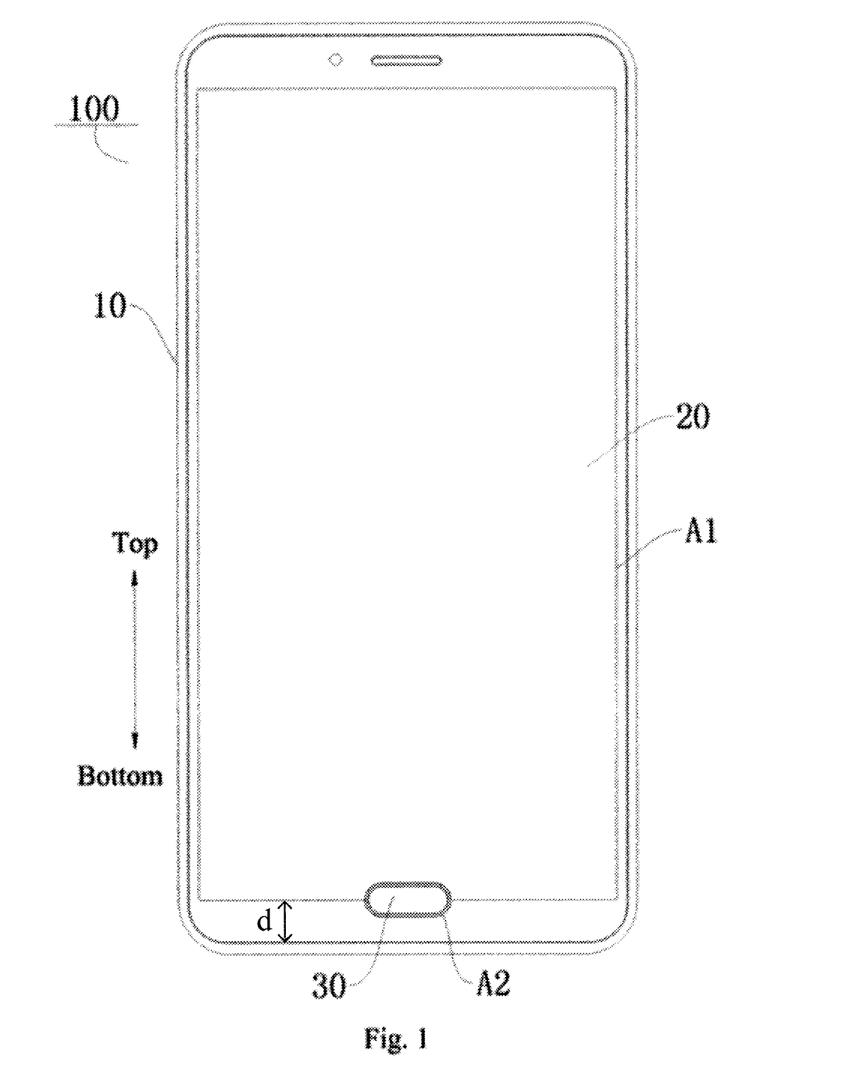
FIG. 1 is a schematic view of an exemplary electronic device according to one embodiment of the present disclosure.

Now referring to FIG. 1, the electronic device 100 may include a shell assembly 10, a display assembly 20 connected to the shell assembly 10 and a fingerprint assembly 30 connected to the shell assembly 10.

The shell assembly 10 may define a receiving room (not labeled) to receive the display assembly 20 and the fingerprint assembly 30 therein. The display assembly 20 and the fingerprint assembly 30 may be assembled a whole to be embedded in the receiving room. In addition, a chamber (not labeled) may be defined in the shell assembly 10, to receive some other components such as a battery, a main circuit plate, a camera assembly etc. It should be noted that the shell assembly 10 may be made in one piece. However, the shell assembly 10 can also be integrated with different sections. For example, the shell assembly 10 may be integrated with a first shell and a second shell connected to the first shell. The assembled assembly of the display assembly 20 and the fingerprint assembly 30 may be embedded in the first shell. The other components of the electronic device 100 may be received in the chamber defined between the first and second shells. Further, various holes may be defined in the shell assembly 10, such as a key hole, an earphone hole, a USB connection hole, a sound hole, a camera mounting hole, a microphone and the like, in order to make the electronic device 100 be connected with other components. In some embodiments, the shell assembly 10 may be made of metal. Patterns, such as a logo, may be provided on the outside surface of the shell assembly 10, which can improve identification and appearance of the electronic device 100. In some embodiments, an antenna slot (not shown) may be defined in the shell assembly 10, and it may be communicated with an antenna component inside the shell assembly 10.

Figure 2:
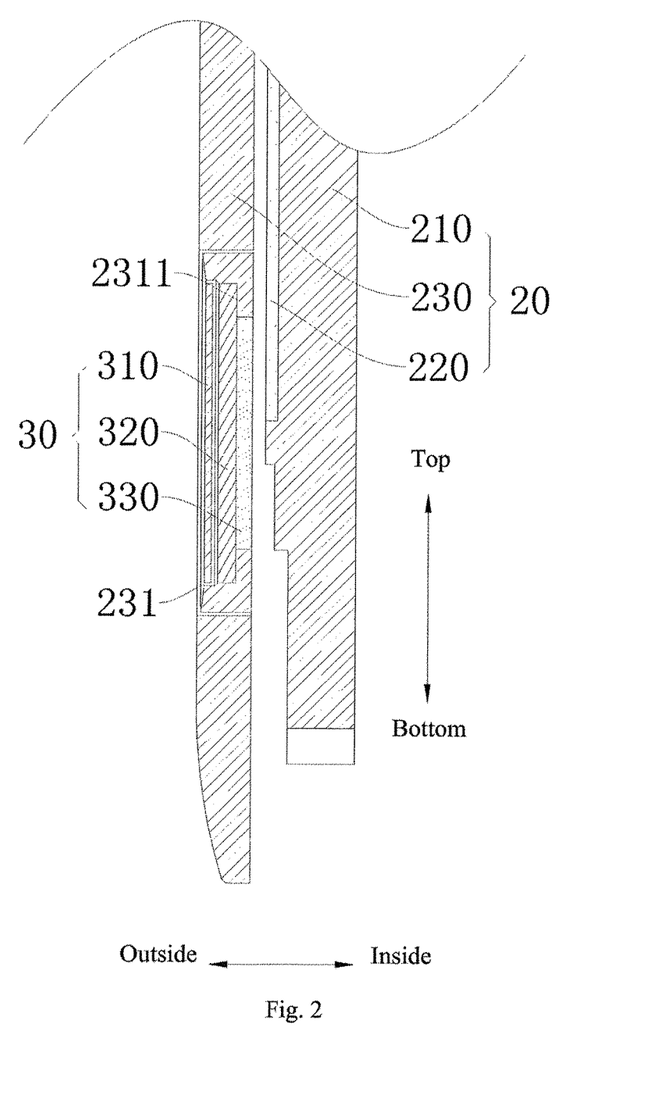
FIG. 2 is a partial cross-sectional view of the electronic device in FIG. 1.

The display assembly 20 may include a display screen 220 (shown in FIG. 2). The display screen 220 may define a first region A1. The first region A1 may be regarded as a display face. The form or shape of the first region A1 may be determined based on the form or shape of the display screen 220, e.g., when the display screen 220 is circular, the first region A1 may be circular and when part of the display screen 220 is curved, the first region A1 corresponding to the part may be a curve. The first region A1 may be configured to display input information from a user, and output information of the electronic device 100, or various items of the electronic device 100 for facilitating the user to read related information.

Figure 4:
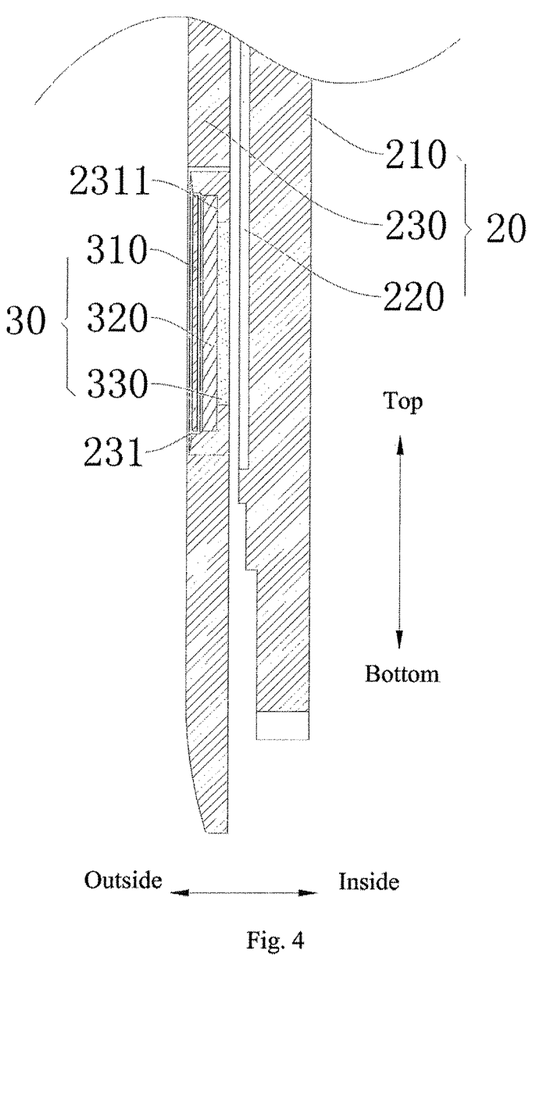
FIG. 4 is a partial cross-sectional view of the electronic device in FIG. 3.

Referring to FIG. 2 and FIG. 4, in some embodiments, the display assembly 20 may include a substrate 210, the display screen 220 attached on the substrate 210 and a protecting plate 230 attached on the display screen 220 such that the display screen 220 may be sandwiched between the substrate 210 and the protecting plate 230.

The substrate 210 may be named as cover plate. It can be made of, for example, glass. The display screen 220 may be attached on the substrate 210 to show the input information from the user, and output information of the electronic device 100, or various items of the electronic device 100. The display screen 220 may include a Liquid Crystal Display (LCD), an Organic Light-Emitting Diode (OLED) and the like.

The protecting plate 230 may be attached on a side of the display screen 220 away from the substrate 210. In this way, the protecting plate 230 can protect the display screen 220 from being damaged, resulting in high lifetime of the display assembly 20. In some embodiments, the protecting plate 230 may include glass, which makes manufacturing cost of the protecting plate 230 low. In some embodiments, the protecting plate 230 may include sapphire or tempered (TP) glass, which can improve structural strength of the protecting plate 230.

The plating plate 230 may define a slot 231. The fingerprint assembly 30 may be engaged in the slot 231. In some embodiments, the slot 231 may extend through the protecting plate 230 and have a depth h. The depth h may be greater than or equal to 0.5 mm and less than or equal to 0.6 mm. It should be noted that a maximum penetration distance between the user's finger and the fingerprint assembly 30 may be provided. The "maximum penetration distance" can be understood as the maximum thickness that the protecting plate 230 may achieve when the fingerprint assembly 30 is induced with the user's finger passing through the protecting plate 230. The thickness of the protecting plate 230 may be in a range of 0.8 mm~0.9 mm. When the depth h meets 0.5 mm≤h≤0.6 mm, the thickness of a bottom wall of the protecting plate 230 corresponding to the slot 231 may be about 0.3 mm. As is tested, when the user's finger closes to the protecting plate 230 and the distance between the user's finger and the fingerprint assembly 30 is about 0.3 mm, there is a sensitive induction between the user's finger and the fingerprint assembly 30, whereby the reliability and sensitivity of the fingerprint assembly 30 may be improved. Further, the structural strengthen of the protecting plate 230 can be ensured, preventing the protecting plate 230 from being broken due to over pressure. In some embodiments, the thickness of bottom wall of the protecting plate 230 may be 0.28 mm to further improve the sensitivity of the fingerprint assembly 30. The protecting plate 230 may include a step 2311 at the slot 231 to engage with the fingerprint assembly 30.

The fingerprint assembly 30 may be connected to the shell assembly 10 and located at a side of the display screen 220 away from the substrate 210. The connection between the fingerprint assembly 30 and the shell assembly 10 may be direct connections or indirect connections. For example, the fingerprint assembly 30 may be assembled with the display assembly 20 to be integral, then the integral assembly may be assembled with the shell assembly 10. Thus, the fingerprint assembly 30 may be supported and fixed by the shell assembly 10. The fingerprint assembly 30 may recognize the user's fingerprint information and transmit the information to a control assembly (for example, a processor) of the electronic device 100 when the user's fingerprint approaches the fingerprint assembly 30. The control assembly may send a corresponding instruction based on the fingerprint information. The fingerprint is unique and cannot change for the lifetime, thereby improving the privacy of the electronic device 100 due to the provision of the fingerprint assembly 30.

The fingerprint assembly 30 may be embedded into the protecting plate 230 to facilitate the assembly of the fingerprint assembly 30. As shown in FIG. 2 and FIG. 4, the fingerprint assembly 30 may include a cover 310, the fingerprint chip 320 and fingerprint flexible printed circuit (FPC) 330 which are connected in series. The cover 310 may be located at a side of the fingerprint chip 320 far away from the substrate 210 of the display assembly 20. The cover 310 may have a circumferential edge engaging (or adhering) with the step 2311 of the display assembly 20 to cover and protect the fingerprint chip 320 and further improve the stability for the fingerprint assembly 30. The fingerprint FPC 330 may be connected to the main circuit board of the electronic device 100. The user's finger and the fingerprint chip 320 may generate induction when the user's fingerprint approaches the fingerprint assembly 30. The induction signal may be transmitted to the control assembly of the electronic device 100. In some embodiments, the cover 310 may include glass or sapphire. That is, the cover 310 may be made of glass or sapphire. Alternatively, the cover 310 may be a tempered glass plate.

The fingerprint assembly 30 may have an orthographic projection area on the display screen 220 of the display assembly 20 in a projection direction from the outside to the inside of the electronic device 100 (shown in FIG. 2 and FIG. 4). The projection direction is perpendicular to a direction of a contact plane of the fingerprint assembly 30 for contacting with the user's finger; i.e., the projection direction is perpendicular to the finger contact plane of the fingerprint assembly 30. The orthographic projection area may be defined as a second region A2. At least part of the second region A2 may be overlapped with the first region A1. Alternatively, the total second region A2 may be fully located in the first region A1.

Figure 8:
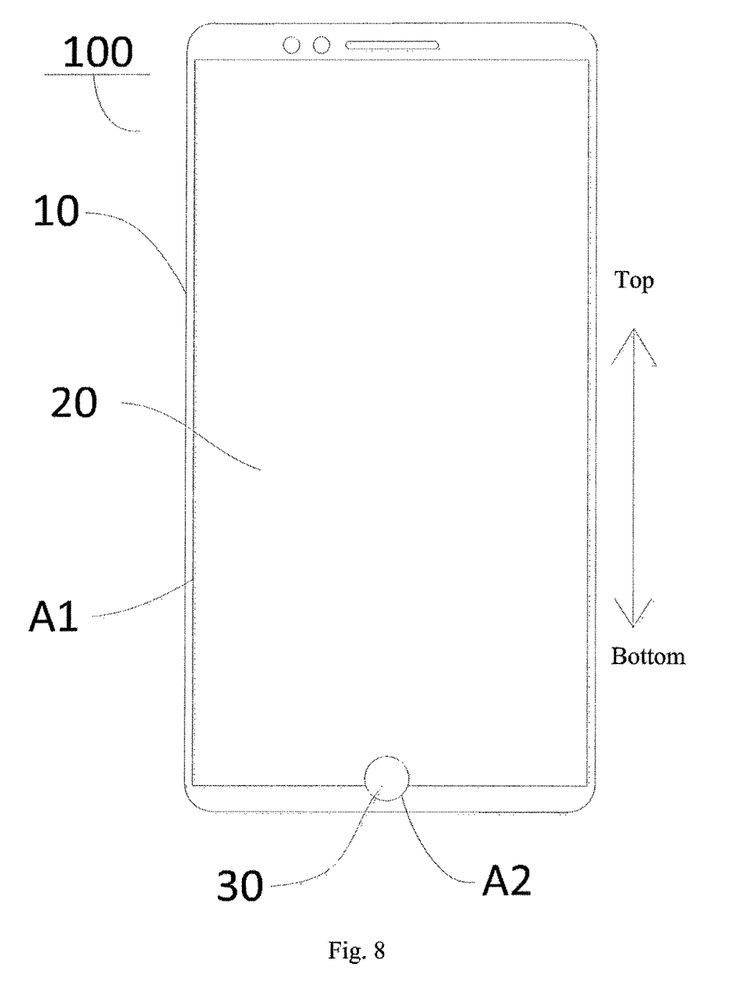
FIG. 8 is a schematic view of an exemplary electronic device according to still another embodiment of the present disclosure.

Referring to FIG. 1 and FIG. 8, a part of the second region A2 may be located in the first region A1 and the other part of the second region A2 may be located outside the first region A1.

It should be noted that at least part of the second region A2 may be overlapped with the first region A1, which means that at least part of the first region A1 may be sheltered by the fingerprint assembly 30. In other words, the first region A1 may have a region covered by an orthographic projection of the fingerprint assembly 30 on the display assembly 20 when the fingerprint assembly 30 is orthographically projected to the display assembly 20. Therefore, the user cannot view what is displayed where the first region A1 is sheltered or covered by the fingerprint assembly 30. For example, there is some information displayed where the first region A1 is overlapped with the second region A2, but the information may be sheltered by the fingerprint assembly 30. Alternatively, there may be not any information displayed where the first region A1 is overlapped with the second region A2.

In some embodiments, at least part of the second region A2 may overlap with the first region A1, and the second region A2 may have a runway shape. As shown in FIG. 1, the runway shape generally includes a rectangle and two semicircles, and the two semicircles are arranged at two ends of the rectangle respectively and opposite to each other. The second region A2 may have a circle configuration, as shown in FIG. 8. Alternatively, the second region A2 may have other configurations, such as, oval, polygon, etc.

Figure 3:
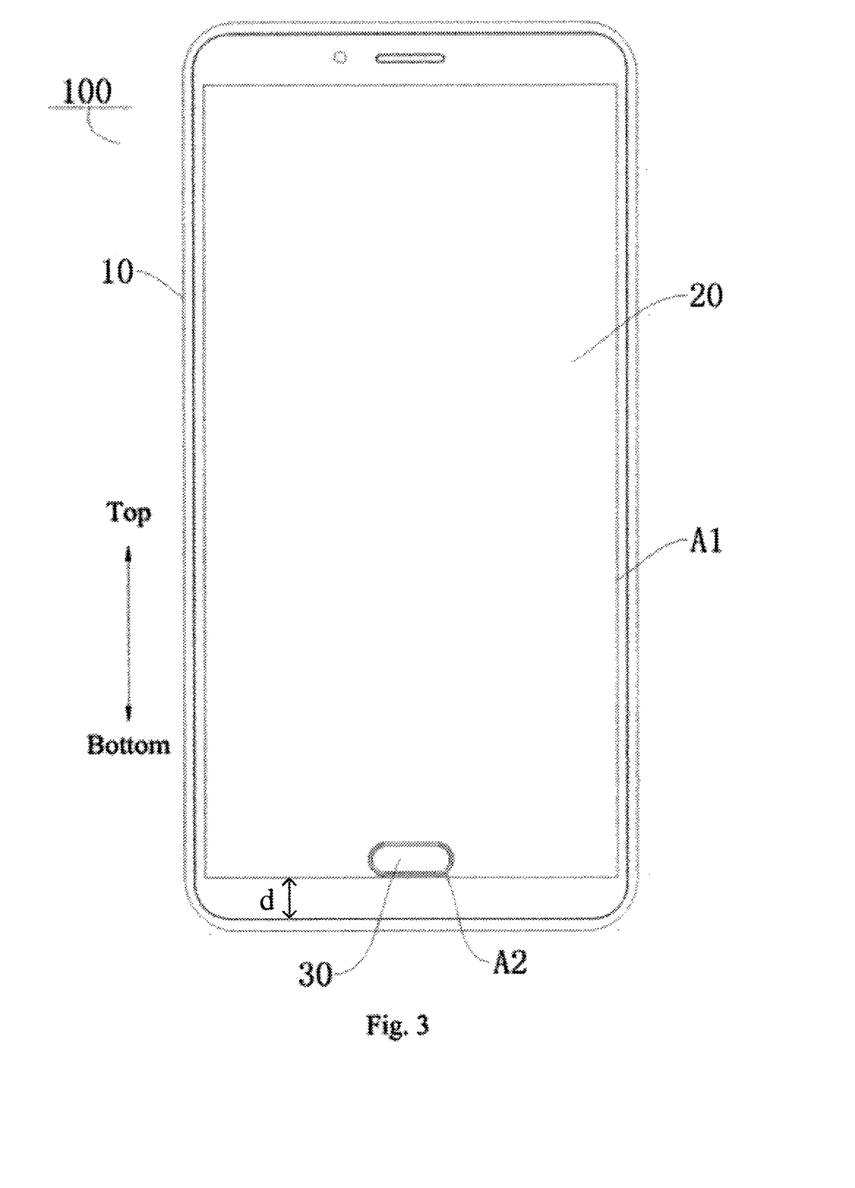
FIG. 3 is a schematic view of an exemplary electronic device according to another embodiment of the present disclosure.
Figure 5:
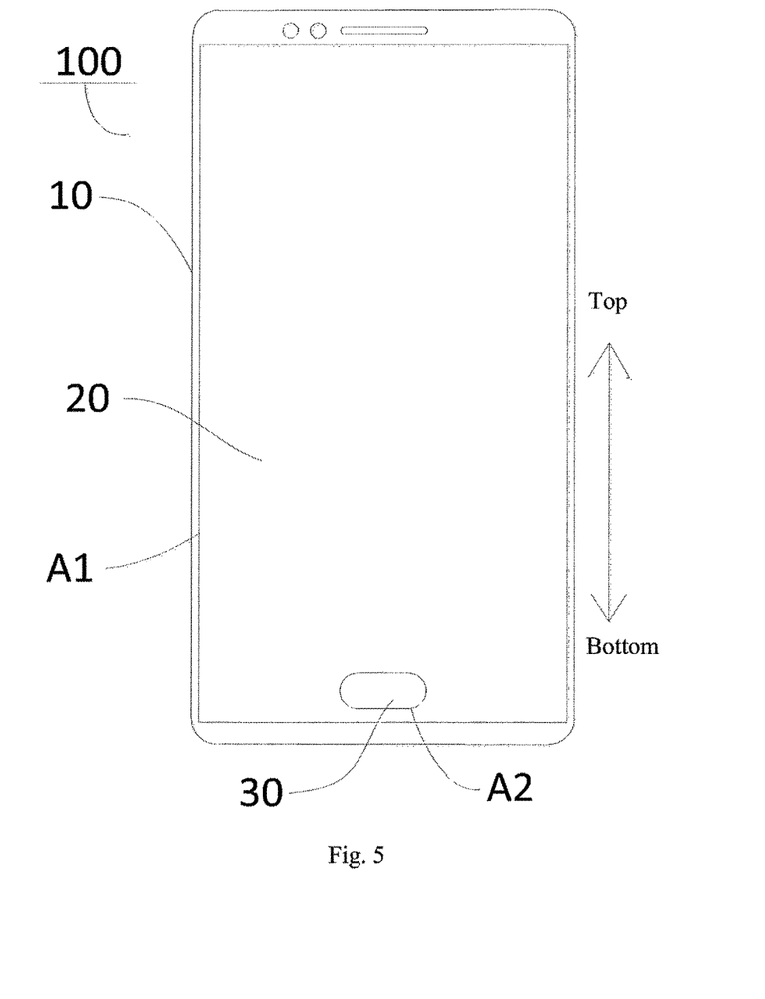
FIG. 5 is a schematic view of an exemplary electronic device according to one embodiment of the present disclosure.
Figure 6:
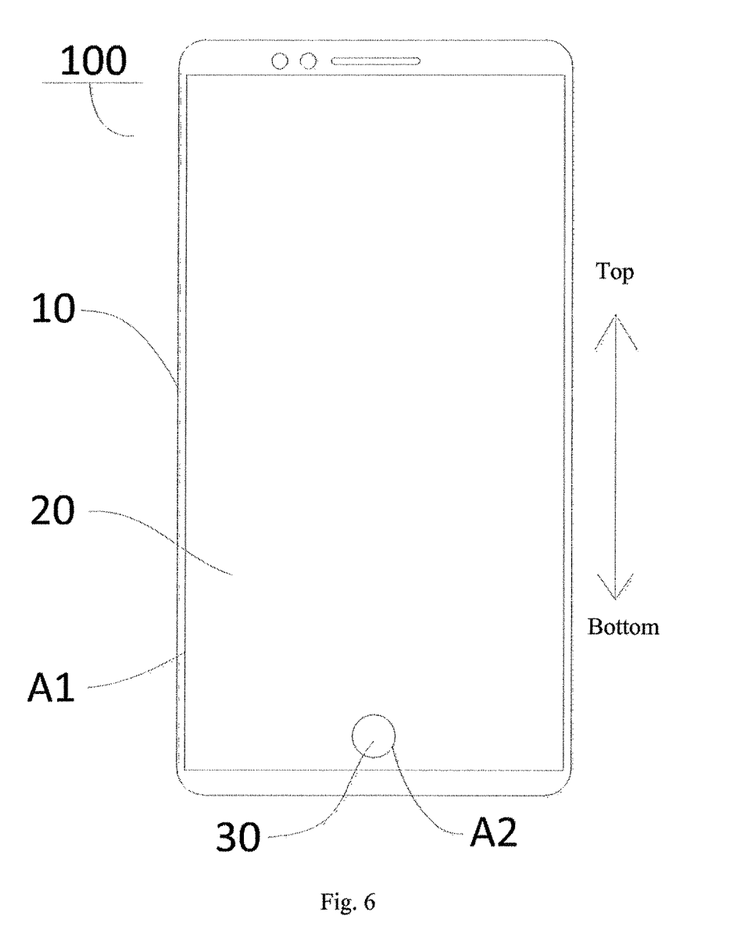
FIG. 6 is a schematic view of an exemplary electronic device according to another embodiment of the present disclosure.
Figure 7:
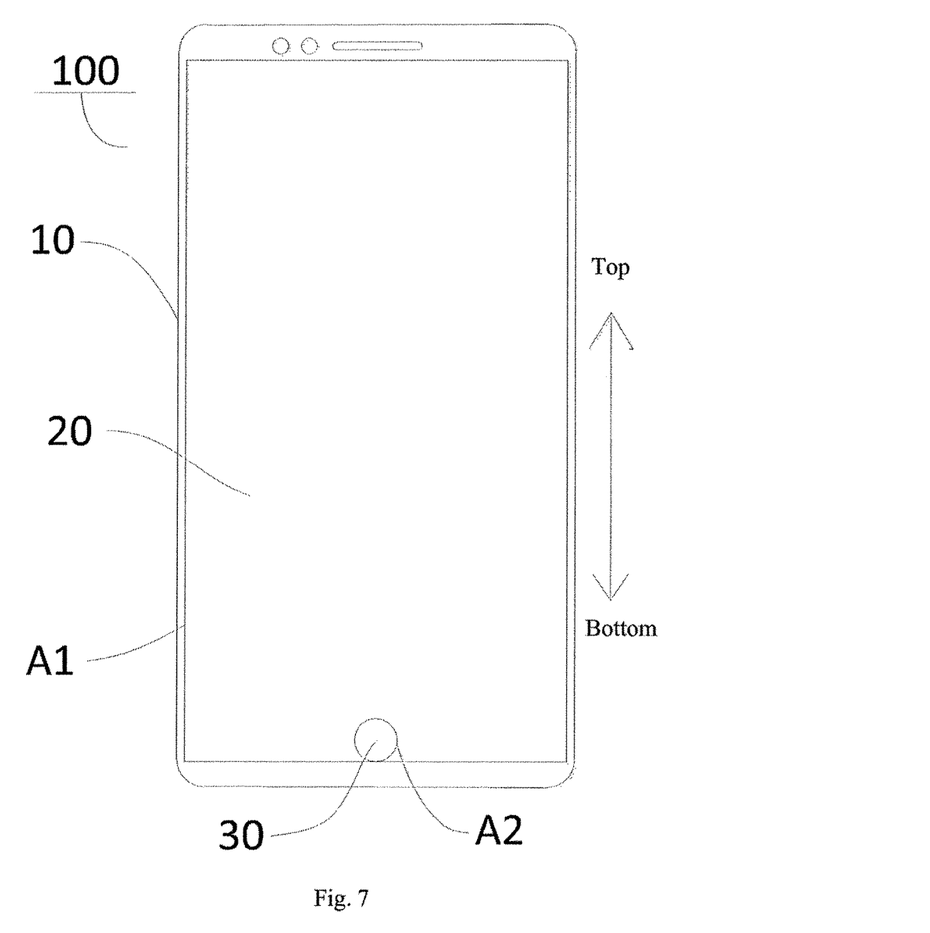
FIG. 7 is a schematic view of an exemplary electronic device according to yet another embodiment of the present disclosure.

In some embodiments, referring to FIG. 3, FIG. 5, FIG. 6 and FIG. 7, the second region A2 may be fully located in the first region A1. In this instance, an edge of the second region A2 may be in contact with an edge of the first region A1, as shown in FIG. 3 and FIG. 7. Alternatively, the edge of the second region A2 may not be in contact with the edge of the first region A1, as shown in FIG. 5 and FIG. 6.

In one embodiment, the second region A2 is fully located in the first region A1 and includes one straight line edge. As shown in FIG. 3, the straight line edge may coincide/contact/be level with the lower edge of the first region A1. That is, the first region A1 and the second region A2 may have a line to line contact. Since the fingerprint assembly 30 is embedded in the slot 231 of the display assembly 20, the fingerprint assembly 30 is provided with a corresponding straight line edge flush with the lower edge of the first region A1. In this way, when the shell assembly 10 has a fixed size, a vertical distance d (labeled in FIGS. 1 and 3) between the display screen 220 of the display assembly 20 and an edge of the shell assembly 10 will be reduced. Thus, the screen-to-body ratio for the electronic device 100 is increased, improving users' experience. The second region A2 under this instance may have a runway shape, as shown in FIG. 3. Alternatively, the second region A2 may have a triangle configuration or other configurations having a straight line edge. It is only made sure that the second region A2 totally falls in the first region A1, and the first region A1 and the second region A2 have the line to line contact.

In one embodiment, the second region A2 is fully located in the first region A1, and the first region A1 and the second region A2 have a point to line contact. In detail, the second region A2 contacts with the lower edge of the first region A1. In other words, the second region A2 is tangential to the lower edge of the first region A1. The second region A2 may have a circle configuration, as shown in FIG. 7 or other configurations tangential to the lower edge of the first region A1.

In other embodiments, the second region A2 is fully located in the first region A1, the second region A2 has none contact with the first region A1, as shown in FIG. 5 and FIG. 6. The second region A2 may have a straight line edge substantially parallel with a lower edge with the first region A1, as shown FIG. 5. The second region A2 may have a runway shape (shown in FIG. 5) or circle configuration (shown in FIG. 6). In some embodiments, the second region A2 may also have other configurations, such as oval, polygon, etc.

In this disclosure, a display module is further provided. The display module may include the display assembly 20 and the fingerprint assembly 30 as described previously, which will not be described in detail.

In this disclosure, a display apparatus is further provided, which may include the display assembly 20 and the fingerprint assembly 30 mentioned previously.

Taking the electronic device 100 as a mobile phone for an example, in one embodiment, the mobile phone may include the shell assembly 10, the display assembly 20 and the fingerprint assembly 30. The mobile phone may further include a RF circuit, a memory, an input unit, a Wi-Fi module, sensors, audio circuits, a processor and a power supply, which are not illustrated with numbers in drawings.

The RF circuit may be configured to receive and transmit information. In special, the RF circuit sends downlink information to the processor after receiving the downlink information from a base station, and transmits uplink data to the base station. Usually, the RF circuit includes, but is not limited to, an antenna, at least one amplifier, a transceiver, a coupler, a Low Noise Amplifier (LNA), a duplexer and so on. In addition, the RF circuit may further communicate with other devices via wireless communication and a network. The wireless communication may use any one communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS) and so on.

The memory may be configured to store software programs and modules, and the processor executes various function applications and data processing of the mobile phone by running the software programs and the modules stored in the memory. The memory may mainly include a program storage region and a data storage region, the storage program region may store an operation system, application programs for at least one function (for example, an audio playing function, an image playing function, etc.) and so on; and the data storage region may store data (for example, audio data, telephone directory, etc.) created according to use of the mobile phone. In addition, the memory may include a high-speed RAM, and may further include a non-volatile memory such as one of at least a disk storage device, a flash device, or other non-volatile solid storage devices.

The input unit may be configured to receive input digital or character information and generate key signal input associated with user setting and functional control of the mobile phone. Specifically, the input unit may include a touch panel and other input devices. The touch panel is also named as touch screen, which is configured to collect touch operations thereon or there-near (such as operations by users' fingers, a touch pen and the like), and drive corresponding connection devices according to preset programs. Optionally, the touch panel may include two parts: a touch detection apparatus and a touch controller. The touch detection apparatus detects a touch operation by a user, converts the detected touch operation into an electrical signal, and transmits the electrical signal to the touch controller. The touch controller receives the electrical signal from the touch detection apparatus, converts the electrical signal into coordinates of a touch point, and then sends the coordinates to the processor. The touch controller may also receive and execute a command sent by the processor. In addition, the touch panel may be a resistive, capacitive, infrared (Infrared), or surface acoustic wave touch panel. The other input devices may include, but are not limited to, one or more of a physical keyboard, a functional key (such as a volume control key and a switch key), a track ball, a mouse, and an operating rod.

The touch panel can cover the display screen 220, when the touch operation on or near the touch panel is detected, the touch panel will transmit the touch operation to the processor to determine the type of touch event; thereafter, the processor can provide a corresponding visual output on the display screen according to the type of the touch event.

Audio circuits, speakers, and microphones can provide an audio interface between the user and the phone. The audio circuit can convert the audio data received into electronic signals, and transmit the electronic signals to the speaker, whereby the speaker can convert the electronic signals to sound signals for output. Moreover, a microphone can convert the sound signal received to electronic signals which will be converted into audio data after reception by the audio circuit. The audio circuit output the audio data to the processor, after processing, the processor can transmit the audio data to another mobile phone via the RF circuit, or, the processor can output the audio data to the memory for further process.

Wi-Fi belongs to a short-range wireless transmission technology, the mobile phone may assist the user in E-mail receiving and sending, webpage browsing, access to streaming media and the like by means of the Wi-Fi module, and it provides a wireless wideband internet access for the user. However, it may be understood that the Wi-Fi module can be optional components of the mobile phone and can totally be omitted without changing the essence of the present disclosure as required.

The processor is a control center of the mobile phone, and it is configured to connect all parts of the mobile phone by utilizing various interfaces and lines, to run or execute the software program and/or the module stored in the memory and call data stored in the memory to execute various functions and processing data of the mobile phone, so as to wholly monitor the mobile phone. Alternatively, the processor may include one or more processing units. The processor may be integrated with an application processor and a modulation-demodulation processor, the application processor mainly processes an operation system, a user interface, an application program and the like, and the modulation-demodulation processor mainly processes wireless communication. It should be understood that the modulation-demodulation processor may not be integrated into the processor.

The power supply may be connected with the processor logically via a power supply management system, so as to implement functions of charging, discharging, power consumption management, etc. by means of the power supply management system. The mobile phone may further include a Bluetooth module, a sensor (such as an attitude sensor, a light sensor, an air pressure gage, a humidometer, a temperature gauge or an infrared sensor) and the like, which are not illustrated, and will not be elaborated herein.

The foregoing disclosed is merely exemplary implementations and it is not intended to limit the scope of the present disclosure; equivalents changes made on the basis of the claims of the present disclosure shall fall into the scope of the present disclosure.

What is claimed is:

1. An electronic device, comprising:
a shell assembly;
a display assembly, having a display face comprising a protecting plate, and connected to the shell assembly; and
a fingerprint assembly, connected to the shell assembly, embedded into the protecting plate, and comprising a cover, a fingerprint chip, and a fingerprint FPC which are connected in series, wherein an orthographic projection area of the fingerprint assembly on the display assembly in a projection direction perpendicular to a finger contact plane of the fingerprint assembly is defined as a second region, and the cover has an edge tangential to or flush with an edge of the display face such that the second region is totally overlapped with the display face.

2. The electronic device of claim 1, wherein the display assembly further comprises:
a substrate; and
a display screen, attached on the substrate and having the display face;
wherein the fingerprint assembly is located at a side of the display screen away from the substrate.

3. The electronic device of claim 2, wherein the protecting plate is located at the side of the display screen away from the substrate and attached on the display screen.

4. The electronic device of claim 3, wherein a slot extends through the protecting plate, and the fingerprint assembly is engaged in the slot.

5. The electronic device of claim 4, wherein the protecting plate comprises a step at the slot to engage with the fingerprint assembly; an edge of the cover is adhered to the step.

6. The electronic device of claim 4, wherein the slot has a depth greater than or equal to 0.5 mm and less than or equal to 0.6 mm.

7. The electronic device of claim 3, wherein the protecting plate is a glass plate.

8. The electronic device of claim 1, wherein an area of a region where the second region is overlapped with the display face is defined as S1, and an area of the second region is defined as S2; a value of $S1/S2$ is equal to 1.

9. The electronic device of claim 1, wherein the display face has an upper edge and a lower edge, and a part of an edge of the fingerprint assembly is flush with the lower edge of the display face.

10. The electronic device of claim 9, wherein the second region has a circle configuration, and the second region is tangential to the lower edge of the display face.

11. The electronic device of claim 9, wherein the second region at least comprises one straight edge extending along a line, and the straight edge is flush with the lower edge of the display face.

12. The electronic device of claim 1, wherein a shape of the second region is selected from one of a circle, an oval, a runway shape and a polygon.

13. A display module, comprising:
a display assembly, having a display face and comprising a protecting plate; and
a fingerprint assembly, embedded into the protecting plate and comprising a cover, a fingerprint chip, and a fingerprint FPC which are connected in series;
wherein the cover has an edge tangential to or flush with an edge of the display face such that the display face has a region covered by a whole orthographic projection of the fingerprint assembly on the display assembly when the fingerprint assembly is orthographically projected to the display assembly.

14. The display module of claim 13, wherein the orthographic projection has a circle configuration, and the orthographic projection is tangential to an edge of the display face.

15. The display module of claim 13, wherein the orthographic projection at least comprises one straight edge extending along a line, and the straight edge is flush with an edge of the display face.

16. A display apparatus, comprising:
a display assembly, comprising:
a cover plate;
a display screen attached on the cover plate; and
a protecting plate configured to be attached on the display screen such that the display screen is sandwiched between the cover plate and the protecting plate; and
a fingerprint assembly embedded in the protecting plate and comprising a cover, a fingerprint chip, and a fingerprint FPC which are connected in series, wherein the cover has an edge tangential to or flush with an edge of the display screen such that the whole fingerprint assembly shelters at least part of the display screen.

17. The display apparatus of claim 16, wherein the display screen is configured to show information needing to be displayed, the fingerprint assembly is totally located above the display screen.

* * * * *